United States Patent
DeFreitas et al.

(10) Patent No.: US 8,248,589 B2
(45) Date of Patent: Aug. 21, 2012

(54) PHASE BASED SENSING

(75) Inventors: Jolyon DeFreitas, Dorset (GB); Roger Ian Crickmore, Dorset (GB)

(73) Assignee: Qinetiq Limited (GB)

( * ) Notice: Subject to any disclaimer, the term of this patent is extended or adjusted under 35 U.S.C. 154(b) by 131 days.

(21) Appl. No.: 12/666,897

(22) PCT Filed: Jul. 4, 2008

(86) PCT No.: PCT/GB2008/002306
§ 371 (c)(1), (2), (4) Date: Dec. 28, 2009

(87) PCT Pub. No.: WO2009/007694
PCT Pub. Date: Jan. 15, 2009

(65) Prior Publication Data
US 2010/0177302 A1    Jul. 15, 2010

(30) Foreign Application Priority Data
Jul. 11, 2007  (GB) .................................. 0713413.3

(51) Int. Cl.
*G01N 21/00*    (2006.01)
(52) U.S. Cl. ..................................... 356/73.1
(58) Field of Classification Search .......... None
See application file for complete search history.

(56) References Cited

U.S. PATENT DOCUMENTS

| | | | |
|---|---|---|---|
| 4,121,155 A | 10/1978 | Chamuel | |
| 4,144,519 A | 3/1979 | Chamuel | |
| 4,231,260 A * | 11/1980 | Chamuel | 73/597 |
| 4,770,535 A | 9/1988 | Kim et al. | |
| 4,947,037 A | 8/1990 | Nash et al. | |
| 6,219,144 B1 * | 4/2001 | Hill et al. | 356/487 |
| 6,522,797 B1 | 2/2003 | Siems et al. | |
| 7,365,858 B2 * | 4/2008 | Fang-Yen et al. | 356/489 |
| 2001/0013929 A1 | 8/2001 | Torsten | |
| 2007/0041020 A1 | 2/2007 | Hall | |
| 2008/0277568 A1 | 11/2008 | Crickmore et al. | |

FOREIGN PATENT DOCUMENTS

| | | |
|---|---|---|
| DE | 198 11 550 | 9/1999 |
| DE | 198 43 806 | 3/2000 |
| DE | 102 33 604 | 2/2004 |
| EP | 0 866 324 | 9/1998 |
| GB | 2442745 | 4/2008 |
| WO | WO 2004/070346 | 8/2004 |

OTHER PUBLICATIONS

Dandliker et al., "Two-Wavelength Laser Interferometry Using Superheterodyne Detection", Optics Letters, vol. 13, No. 5, May 1988, pp. 339-341.

* cited by examiner

*Primary Examiner* — Tu Nguyen (74) *Attorney, Agent, or Firm* — McDonnell Boehnen Hulbert & Berghoff LLP (57) ABSTRACT

A method of interrogating a phase based transducer by providing a pulsed input including two different wavelengths in which the different wavelength components can be used to derive a phase change experienced by a synthetic wavelength, and by arranging for the synthetic wavelength to be significantly greater that the component wavelengths, the phase so detected has a reduced sensitivity, and is less susceptible to overscaling effects.

16 Claims, 8 Drawing Sheets

PHASE BASED SENSING

BACKGROUND OF THE INVENTION (1) Field of the Invention

The present invention relates to sensors which exploit a change in phase of an interrogation signal to determine a sensed parameter, and particularly, but not exclusively to fibre optic interferometric sensing. The present invention finds particular application in the filed of seismic surveying and imaging.

(2) Description of the Art

Fibre optic sensors employ a length of optic fibre arranged in such a way that a sensed parameter causes a strain to be imposed on the fibre. Typically the fibre is arranged in a coil, although other arrangements are possible. Such strain causes a change in phase of the optical signal propagating in that fibre, which change can be detected by interferometric techniques. A variety of different arrangements for this type of transducer have previously been proposed, many of which have the coil of optic fibre wound on a deformable core or mandrel, which undergoes radial expansion or contraction in response to the sensed parameter, such as sensed vibration.

Such fibre optic sensors can exhibit extremely high sensitivities, and have the advantage of being completely passive, employing no power at the sensing transducer. Such sensors have also proved popular in applications where large arrays of sensors are required, on account of the relative ease with which they can be multiplexed.

An example of such an application is seismic surveying in the oil and gas exploration industry, where large time multiplexed arrays comprising hundreds or even thousands of vibration sensors and/or hydrophones can be used to sense reflections of an incident pulse from geological formations beneath the sea bed. Sampling such an array at regular periods provides 3D time lapsed data on existing or potential new reserves.

A problem experienced with this approach to sensing is that, for a given sampling rate, signals above a certain amplitude threshold cause the phase based sensed information to become distorted, and can cause failure of the demodulation process. This effect, commonly referred to as overloading or overscaling is dependent on the frequency of the measured signal. In seismic systems this can cause a particular problem with the direct arrival of the incident pulse, especially when that pulse has been generated close to the sensors (usually by an airgun towed from a surface vessel as it passes over the array). It is desirable to be able to record this incident pulse without the distortion that overscaling can produce.

It is known in the field of optical metrology that a combination of two wavelengths can be used to measure relatively large optical path lengths, of the order of 1 mm for example, to extremely high accuracies using interferometric techniques. This has the effect that the light propagating through the interferometer can be considered as having the synthetic wavelength, giving rise to a synthetic phase or phase change. See for example R. Dandliker, R. Thalmann, and D. Prongue, "Two-wavelength laser interferometry using superheterodyne detection," Opt. Lett. 13, 339-(1988), which describes a free space interferometer capable of operating at a synthetic wavelength created by two laser sources operating in multiple polarisation states.

SUMMARY OF THE INVENTION

It is a general object of the present invention to provide improved sensing methods and apparatus, and an object of specific aspects of the invention to provide improved methods and apparatus for sensing using a multiplexed fibre optic sensor array.

According to a first aspect of the invention there is provided A method of interrogating a phase based transducer, said transducer adapted to provide a phase output in response to a sensed parameter, said method comprising inputting first and second input pulses to said transducer, said pulses having a time delay therebetween, receiving an output from said transducer in response to said first and second input pulses, and processing the output to determine a measure of the sensed parameter, wherein at least one of said input pulses contains components of at least two different wavelengths.

In this way, the transducer can be considered to operate in response to a synthetic wavelength produced by the combination of the two different input wavelengths, producing a synthetic phase output. By arranging for the synthetic wavelength to be significantly greater than either of the two component wavelengths, the synthetic phase is relatively small, and therefore less susceptible to overscaling. Furthermore, since polarisation is not required, a less complex physical implementation is afforded. The method is therefore applicable to existing sensor arrangements, including multiplexed arrays, with little or no modification of hardware.

The precise arrangement of wavelengths and pulse timings of possible embodiments are discussed in greater detail below, however in a particularly preferred embodiment one pulse is formed of a first component having a first wavelength and first frequency shift ($\lambda_1$ and $f_1$), and a second component having a different wavelength $\lambda_2$ and a different frequency shift $f_2$. The other pulse of the pulse pair is again formed of two components, the first component having the first wavelength $\lambda_1$ and the second component having the second wavelength $\lambda_2$, ie both pulses have essentially the same combination of wavelengths. Both components of the other pulse however have a common, third frequency shift $f_3$.

This arrangement provides particular advantage in processing the output of a transducer in order to provide a phase measure and hence a measure of the sensed parameter. According to this embodiment, it can be arranged for the transducer output to include phase components at different wavelengths and having different combinations of the three input frequencies. Careful selection of the input frequencies advantageously allows the desired output phase to be derived by frequency selective processes. Preferably the difference between frequencies from different pulses is significantly greater than the difference between the two frequencies in the same pulse.

This is particularly well exploited in an arrangement in which the transducer is adapted to produce an output pulse having components derived from both said input pulses, embodiments of which are described in greater detail below.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE DRAWINGS

Preferred features of the present invention will now be described, purely by way of example, with reference to the accompanying drawings, in which.

DESCRIPTION OF THE INVENTION

Figure 1:
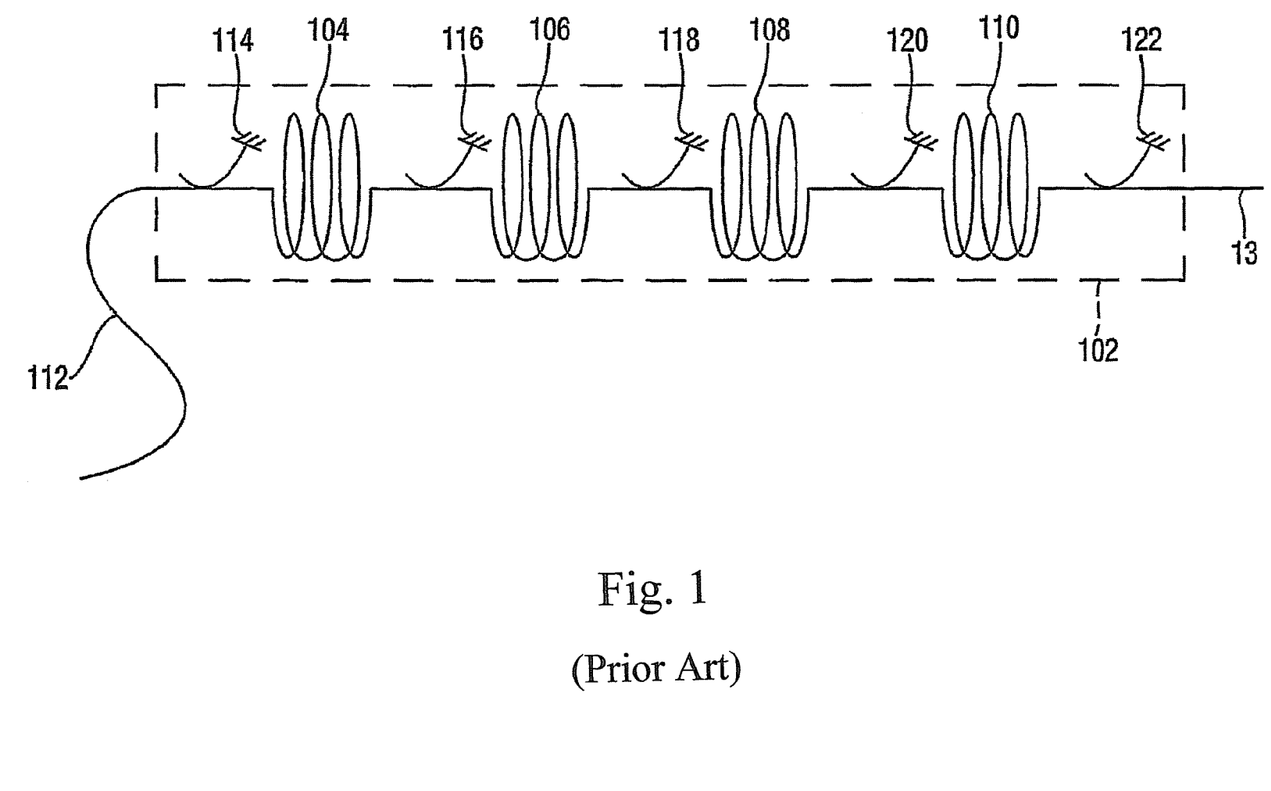
FIG. 1 shows a prior art fibre optic transducer arrangement

Referring to FIG. 1, there is shown schematically a known type of fibre-optic sensor package, indicated generally 102, comprising four individual fibre-optic sensing coils 104, 106, 108, 110 formed from a single length of optical fibre 13, and arranged in series. A portion of the optical fibre 112 serves as the package input/output (i/o) fibre. Fibre-coupled mirrors 114, 116, 118, 120, 122 are coupled to the optical fibre 13 at respective locations along it such that each of the coils has a fibre-coupled-mirror coupled at each end of it. Other means of reflecting a portion of light from before and after each sensor such as in fibre Bragg gratings could be used instead of the fibre coupled mirrors. In practice for example, three of the coils could be arranged to form three orthogonal fibre optic accelerometers, with the fourth coil forming part of a hydrophone to form a four-component package suitable for seismic surveying applications. The physical arrangement of the coil in each transducer is not material to the present invention, and is not discussed here, however a range of possible arrangements will be known to the skilled reader. A large scale array of such packages can be coupled together, arranged in a spatial configuration, and interrogated periodically using multiplexing to provide time lapsed seismic imagery for example.

Figure 2:
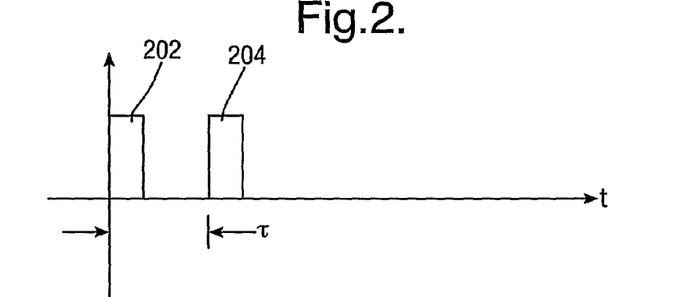
FIG. 2 illustrates a pair of time spaced input pulses

Referring to FIG. 2, an interrogation of the package 102 of FIG. 1 may be carried out by introducing a pair of interrogating optical pulses 202, 204 into the package i/o fibre 112. Pulses 202, 204 have respective frequencies $\omega_1$, $\omega_2$ and pulse 202 is delayed by $\tau=2L/c$ with respect to pulse 204, L being the length of coil in the sensor and c being the speed of an optical pulse in the fibre.

Figure 3A:
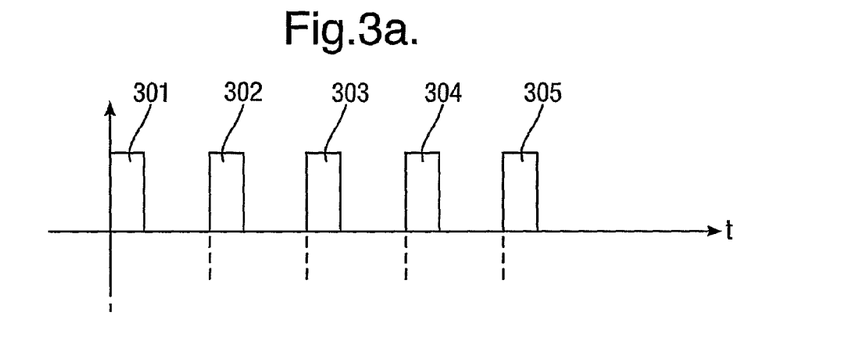
FIGS. 3a-3c show output pulses returned in response to the input of FIG. 2
Figure 3B:
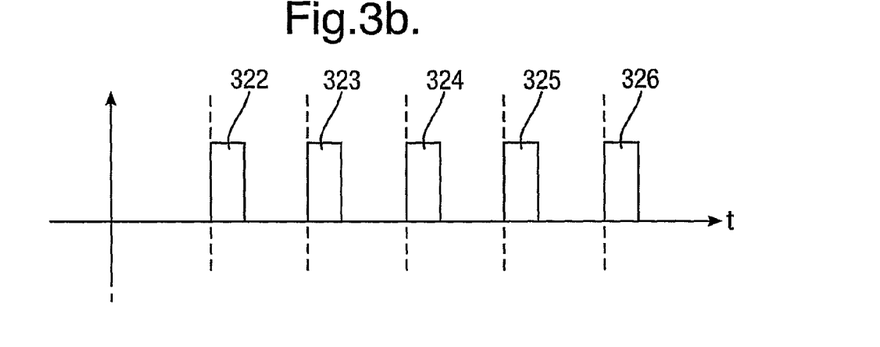
Figure 3C:
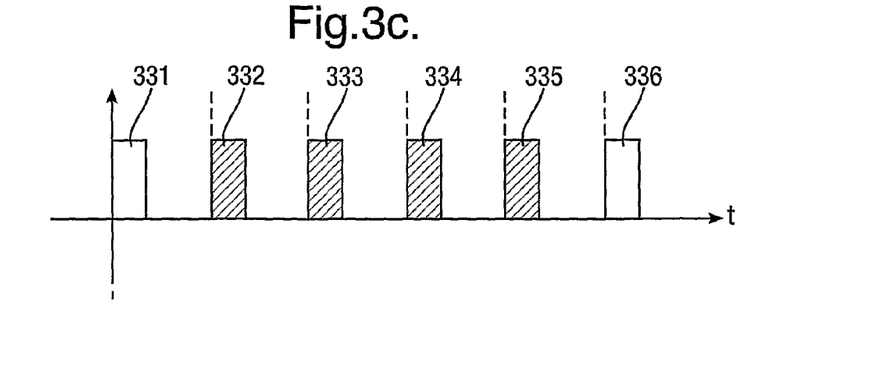

FIG. 3 illustrates the optical output response of the package by considering the output formed by each of the pair of input pulses. In FIG. 3a the first pulse 202 to arrive at the package is reflected off each of the 5 fibre-coupled mirrors to produce five output pulses 301, 302, 303, 304 and 305, measured relative to an arbitrary time reference. Similarly, looking at FIG. 3b, pulse 204 produces five time delayed output pulses 322, 323, 324, 325 and 326 relative to the same arbitrary time reference. Because the input pulses are delayed by twice the time of flight through a single coil, and because the pulses exist on the same fibre, the two sets of outputs are superposed to produce six pulses 331, 332, 333, 334, 335 and 336 shown in FIG. 3c. Pulses 331 and 336 represent only a single reflection of a single pulse, however it will be understood that pulses 332 to 335 (shown shaded) each correspond to the combination of two pulses reflected by adjacent fibre coupled mirrors. It will be understood that these pulses therefore represent the combination of a pulse which has passed (twice) through the coil between the two adjacent mirrors, and a pulse which has not. Phase detection can therefore be used to determine the phase change imposed by that coil, and hence a measure of the sensed parameter is obtained as is known in the art.

If $\phi(t)$ is the sensed parameter, then the signal obtained from a photodetector used to measure a series of pulses returning from a sensor of the type described above can be written as $\cos(\omega_c t + \phi(t))$ ie. the sensed information is represented as a phase change superimposed on a carrier signal of frequency $\omega_c$. Techniques that are well known to those skilled in the art can then be used to demodulate the phase signal from the carrier. The carrier frequency is typically chosen to be half of the Nyquist frequency, which is in turn half of the sampling frequency. It is usual for each returning optical pulse to be sampled once and so the sampling frequency is the rate at which pulse pairs are transmitted into the array. By way of an example, the sampling frequency could be approximately 320 KHz, giving a Nyquist frequency of approximately 160 KHz and a carrier frequency of approximately 80 KHz. The sampling frequency will typically have a practical upper limit dependent upon the type and arrangement of sensor or sensors, amongst other factors.

An overscale condition occurs when the instantaneous frequency of the phase modulated carrier falls outside the Nyquist band i.e. when $$\frac{d\varphi(t)}{dt} \geq \omega_N - \omega_c$$

or when $$\frac{d\varphi(t)}{dt} \leq -\omega_c,$$

where $\omega_N$ and $\omega_c$ are the Nyquist and carrier frequencies respectively. In practice this results in aliasing of instantaneous frequency back into the Nyquist band by folding or wrapping around one of its limits in frequency space. Depending on the magnitude and frequency of the sensed parameter, the instantaneous frequency can be wrapped back multiple times. If the sensed parameter is modeled approximately as $\omega(t)=\omega_0 \cos \omega_m t$, then the condition for overscale not occurring, for the usual condition of $\omega_N=2\omega_c$ is sometimes expressed as $$\varphi_0 \leq \frac{\omega_c}{\omega_m}.$$

As will be explained in greater detail below, the larger the interrogating wavelength, the smaller is the phase value returned, and hence the lower is the sensitivity to overscale problems. However there is a practical limit to the values of wavelengths which can be propagated through optic fibres, which are the preferred application for the present invention. By generating a synthetic wavelength from two or more significantly smaller wavelength components however, a synthetic phase measurement having reduced sensitivity to overscale is afforded.

Figure 4:
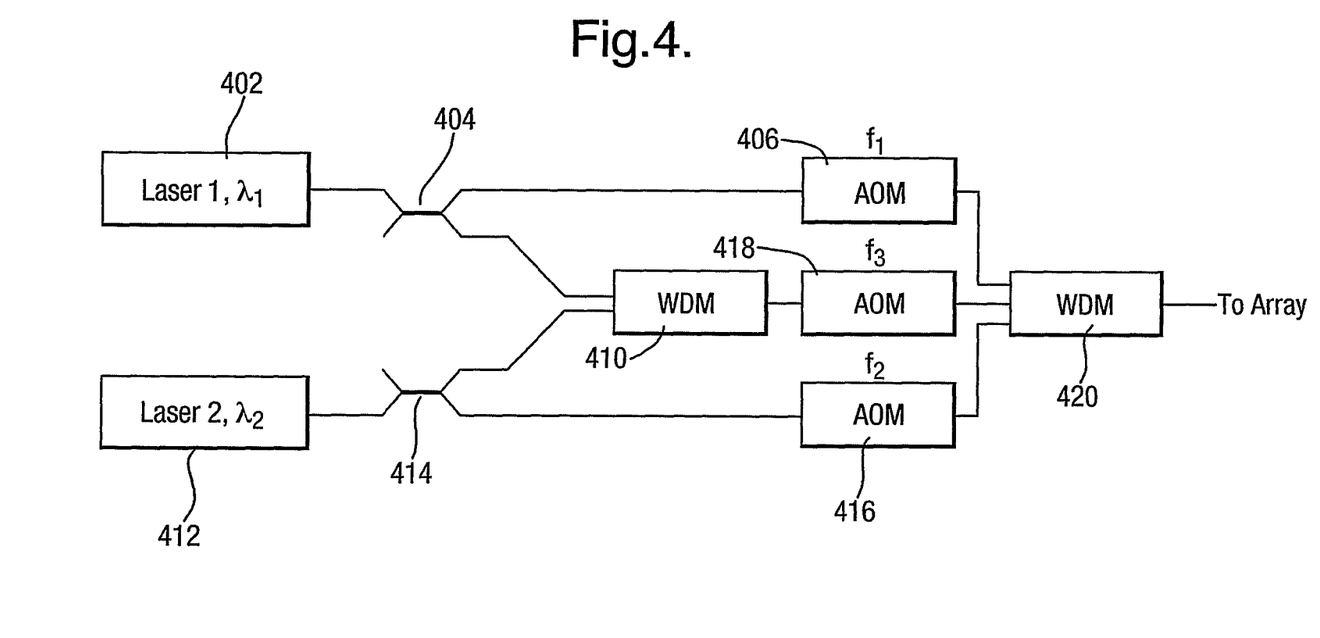
FIG. 4 shows an arrangement for producing an interrogation signal according to an aspect of the present invention.

FIG. 4 shows an arrangement for producing an interrogation signal according to the present invention. Laser source 402 produces light with wavelength $\lambda_1$ which propagates down through the fibre and is split by a coupler 404 so that part of the light enters a first acousto-optic modulator (AOM) 406 and the second part enters a wavelength division multiplexer (WDM) 410. In a similar manner, light from a second laser source 412 at wavelength $\lambda_2$ is also split by a coupler 414, with part entering WDM 410 and the other part routed through to a second AOM, 416. Light from WDM 410 passes to a third AOM 418.

The AOMs are adapted to modulate their inputs at certain intervals to allow the passage of pulses of light through the device. AOM 406 is first switched on and shifts wavelength $\lambda_1$ through frequency $f_1$ and simultaneously AOM 416 switches wavelength $\lambda_2$ through frequency $f_2$. AOM 418 is switched on after a delay period determined by the geometry of the sensor being interrogated and shifts both wavelengths (having been combined in WDM 410) through frequency $f_3$. In embodiments adapted to interrogate a sensor system as illustrated in FIG. 1, the delay period corresponds to twice the time of flight through a coil of the array, and thus the basic principle of operation, and pattern of pulses of input and output is substantially unchanged. The combination of frequencies and wavelength is of course considerably more complex as will be explained below.

Frequency shifts imposed by AOMs necessarily also result in a change in wavelength. However, the changes are many orders of magnitude smaller than their base values, and as will be appreciated by the skilled reader it is beneficial for the purposes of this specification to ignore this wavelength perturbation, ie. to consider the output of an AOM to have the same wavelength as its input. References to wavelengths should be construed accordingly. Similarly, two different frequency shifts will typically result in two different frequencies. Both terms may be used herein, and references to frequencies and frequency shifts should be construed appropriately where necessary.

The light emerging from AOMs 406, 416 and 418 are multiplexed together in a further WDM 420 for onward transmission to the sensor array, so that little light energy is lost through the pulsing network.

Figure 5:
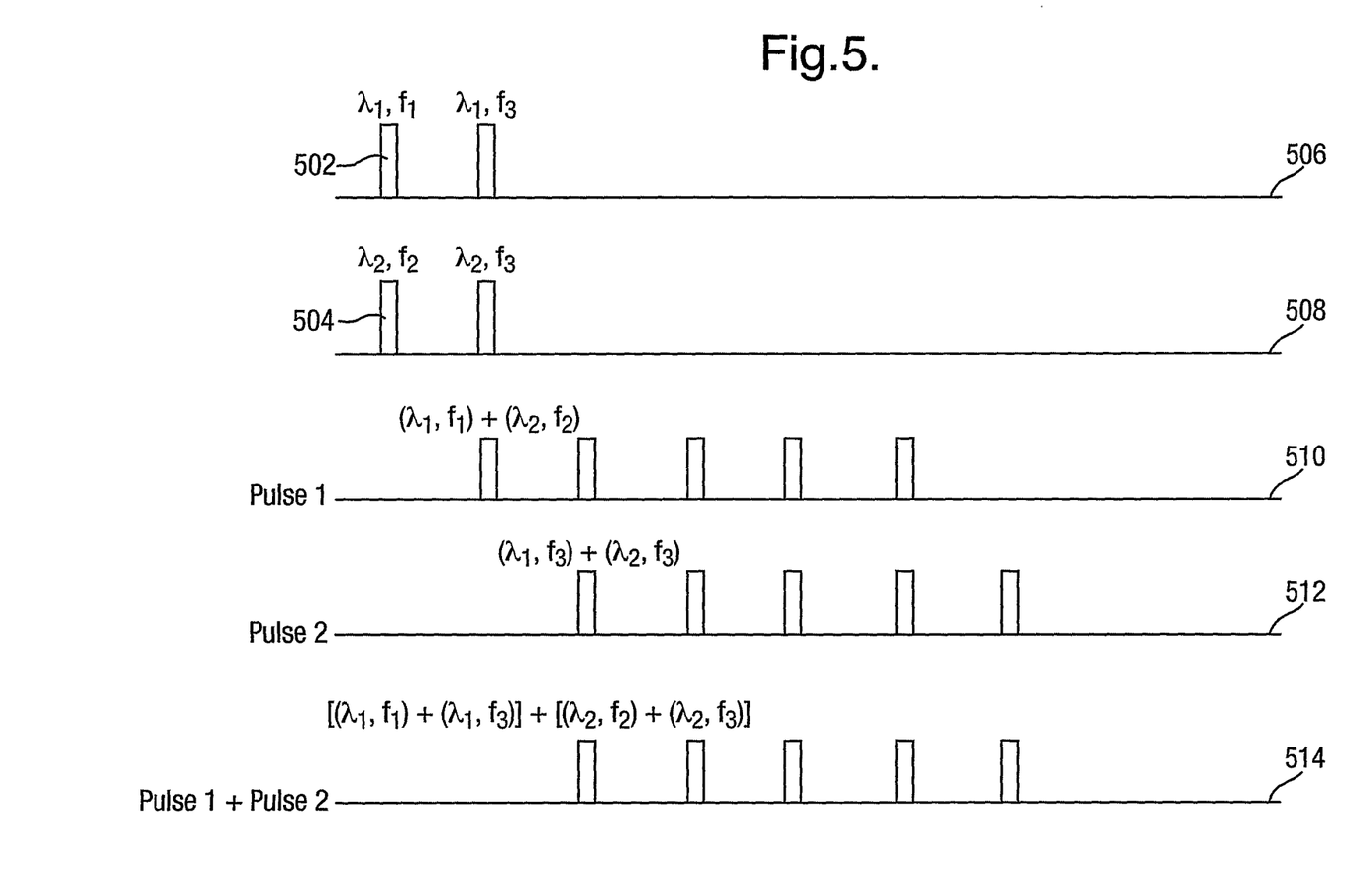
FIG. 5 illustrates the pulsed output of the arrangement of FIG. 4.

Referring to FIG. 5, the result of the arrangement of FIG. 4 results in a first pulse containing $\lambda_1$ shifted through $f_1$, shown as 'component' pulse 502, and $\lambda_2$ shifted through $f_2$, shown as 'component' pulse 504. The second pulse is shown to contain both wavelengths shifted through $f_3$. While it is convenient to consider component pulses individually for ease of understanding, and while pulses 502 and 504 can be identified as the outputs of AOMs 406 and 416 respectively in FIG. 4, it will be understood that the actual signal applied to a sensor or sensor array is the wavelength division multiplexed combination of pulse trains 506 and 508.

The output received from a sensor array such as that of FIG. 1, in response to the first pulse of the input described above is illustrated as pulse train 510 and is analogous to FIG. 3a, while the corresponding output from the second pulse is shown as 512, and is analogous to FIG. 3b. Finally the combined outputs are shown as 514, and are analogous to FIG. 3c. it can be seen that the combined output contains pulses including both wavelengths and all three frequencies used in forming the interrogating waveform.

Although the input pulse pattern has been illustrated having first and second frequencies in the first pulse and the third frequency in the second pulse, it will be appreciated that the order of the pulses could equally be reversed, by changing the switching order of the AOMs.

In an interferometric system embodying the present invention, output pulses represent the combination of input pulses containing data represented as a phase difference. Here, because two different wavelengths are input to the sensor or transducer the phase difference acquired between the two arms of the interferometer will also be different. The difference between these two measurements is $$\Phi = \phi_1 - \phi_2 = 4\pi n_{eff} L/\lambda_1 - 4\pi n_{eff} L/\lambda_2 = [4\pi n_{eff} L/(\lambda + \Delta\lambda)](\Delta\lambda/\lambda)$$

where $\lambda_1 = \lambda$, and $\lambda_2 = \lambda + \Delta\lambda$. It is therefore apparent from this approach that the interferometer behaves as though the light propagating through its arms has a synthetic wavelength $$\lambda_{syn} = (\lambda + \Delta\lambda)\lambda/\Delta\lambda$$

Thus the smaller the difference between the wavelengths, the larger the synthetic wavelength, and therefore the smaller the synthetic phase, $\Phi$.

The synthetic wavelength approach reduces the sensitivity of the sensor by the factor $(\Delta\lambda/\lambda)$. It is then desired to perform phase detection of the synthetic phase to determine the phase change imposed by the transducer, and hence a measure of the sensed parameter. Arrangements capable of performing this phase detection are shown in FIGS. 5a and 5b.

Before considering this detection in further detail, it is useful to consider the output from the transducer. The coherent intensities can be expressed as:

$$I(\lambda_1) = I_{o1}\{1 + V_1 \cos[2\pi(f_1 - f_3)t + \phi(M+1, \lambda_1) - \phi(M, \lambda_1)]\}$$

$$I(\lambda_2) = I_{o2}\{1 + V_2 \cos[2\pi(f_2 - f_3)t + \phi(M+1, \lambda_2) - \phi(M, \lambda_2)]\}$$

where $I(\lambda_1)$ and $I(\lambda_2)$ are the interferograms corresponding to wavelengths $\lambda_1$ and $\lambda_2$. $\phi(M+1, \lambda_1)$ and $\phi(M, \lambda_1)$ are the phase acquired by wavelength 1 between mirrors M+1 and M in the array, or more generally between different arms of the interferometer in question. If we substitute in these expressions:

$$\omega_1 = 2\pi(f_1 - f_3)$$

$$\omega_2 = 2\pi(f_2 - f_3)$$

$$\phi_1 = \phi(M+1, \lambda_1) - \phi(M, \lambda_1)$$

$$\phi_2 = \phi(M+1, \lambda_2) - \phi(M, \lambda_2)]$$

Then the interferograms could be written as $$I(\lambda_1) = I_{o1}\{1 + V_1 \cos[\omega_1 t + \phi_1]\}$$

$$I(\lambda_2) = I_{o2}\{1 + V_2 \cos[\omega_2 t + \phi_2]\}$$

Figure 6A:
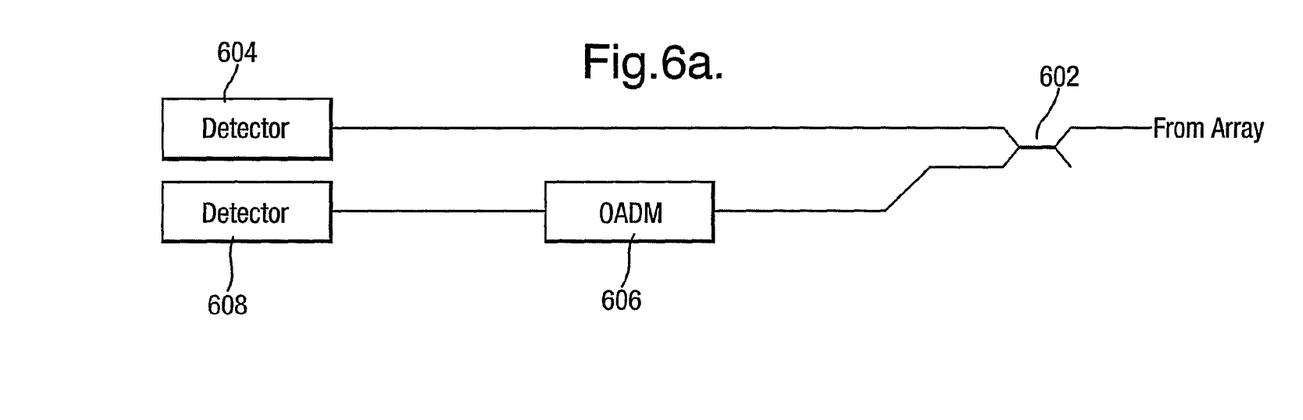
FIGS. 6a and 6b show detection arrangements.

Turning now to FIG. 6a, Light returning from the array and which contains both wavelengths is first split in a coupler 602 or other suitable means. One part containing both wavelengths) travels to detector 604, whereas the second part propagates to an optical de-multiplexer 606 where the wavelengths are separated. Wavelength $\lambda_2$ is passed to detector 608.

Figure 6B:
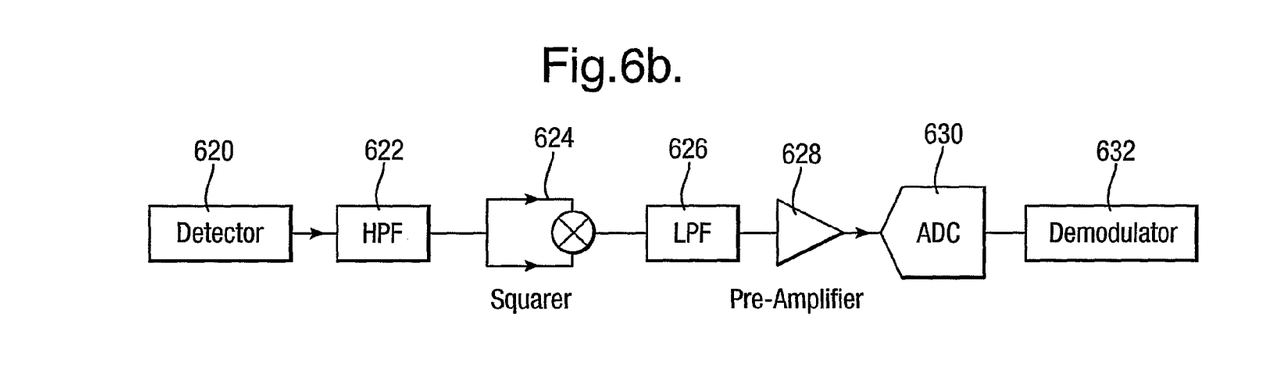

FIG. 6b shows the detail of detector 604 of FIG. 6a. Pulsed optical signals containing high frequency (80-100 MHz) fall on the photodetector 620 and are converted to electrical signals. The electrical signal is first dc blocked using a suitable high pass filter 622 e.g. 1 kHz cut-on using an analogue filter such as a Butterworth filter. The high pass signal is then squared in an analogue squarer 624 using a high frequency balanced four-quadrant multiplier. This gives frequency components at $2\omega_1$, $2\omega_2$, $(\omega_1 + \omega_2)$ and $(\omega_1 - \omega_2)$ as follows:

$$[I(\lambda_1 + \lambda_2)_{ac}]^2 = \frac{1}{2}(I_{o1}V_1)^2 + \frac{1}{2}(I_{o2}V_2)^2 + \frac{1}{2}(I_{o1}V_1)^2 \cos(2\omega_1 t + \phi_1) + \frac{1}{2}(I_{o2}V_2)^2 \cos(2\omega_2 t + \phi_2) + I_{o1}I_{o2}V_1V_2 \cos[(\omega_1 + \omega_2)t + (\phi_1 + \phi_2)] + I_{o1}I_{o2}V_1V_2 \cos[(\omega_1 - \omega_2)t + (\phi_1 - \phi_2)]$$

The synthetic phase $\phi_1 - \phi_2$ is at the difference frequency $(\omega_1 - \omega_2)$ and is obtained by low-pass filtering the signal after the squarer at 626.

The resulting is pre-amplified at 628, digitised by a high frequency ADC 630 and passed to a phase demodulator 632 which can operate in any well known fashion.

If we choose as an example $f_1$=200 MHz (upshift), $f_2$=200.04 MHz (upshift), and $f_3$=110 MHz (upshift), then the carrier frequency associated with each interferogram becomes $(f_1-f_3)$=90 MHz and $(f_2-f_3)$=90.04 MHz. The precise values of $f_1$, $f_2$ and $f_3$ are typically dictated by available acousto-optic modulator (AOM) frequencies, pulse transition edge and the final carrier frequency $(f_1-f_2)$=0.04 MHz. The latter is typically selected to accommodate the array design.

Figure 7:
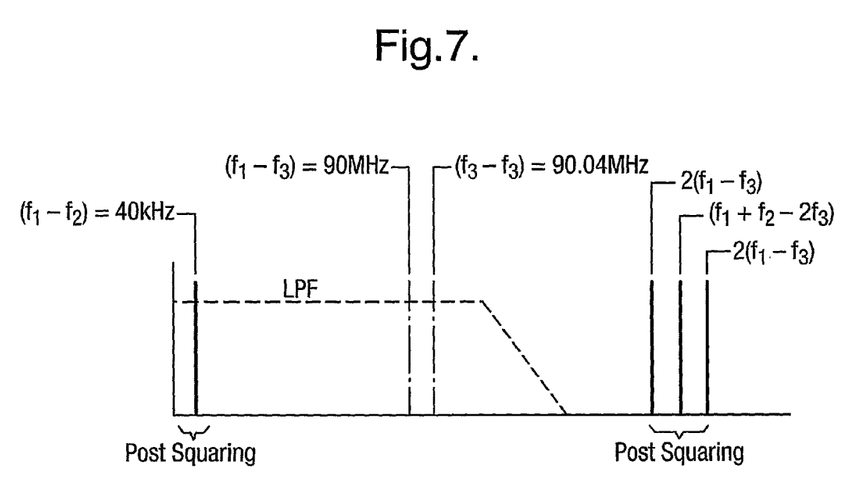
FIG. 7 is a frequency diagram illustrating aspects of the detector arrangements of FIG. 6.

FIG. 7 shows the relationship between these frequencies and the analogue low pass filter 626. In this case, the pulse repetition rate is 160 kHz. To maintain a pulse transition edge of about 10 ns, the low-pass filter is shown to have a cut-off of about 100 MHz, and to avoid interference from sum and double frequency components, filter rejection should preferably be at least −60 dB at 180 MHz.

To recover the 'Normal' phase information, which is to say the phase information at a single wavelength, the pulses retrieved from detector 608 ($\lambda_2$ having a carrier frequency 90.04 MHz as noted above) are sub-sampled by an analogue to digital converter (ADC) at a slower (but more usual pulse repetition) sampling frequency 160 kHz so that the carrier in the said signal is aliased back to $(f_1-f_2)$=40 kHz. The sub-sampled signal is then demodulated in a demodulator. The demodulated signal corresponds to $\phi_2$. The aliasing condition for typical operation is $$\{1-\text{REM}[(f_1-f_3)/f_N]\} \times f_N = (f_1-f_2).$$

where 'REM' is the remainder after division within the [ ] brackets and $f_N$ is the Nyquist frequency. The Nyquist frequency here is 80 kHz.

In the case discussed above, $[(f_1-f_3)/f_N]$=[90.04 MHz/80 kHz]=1125.5; the REM(1125.5)=0.5, so that $\{1-\text{REM}[(f_1-f_3)/f_N]\} \times f_N$=40 kHz, which is $(f_1-f_2)$. We could easily make $(f_1-f_3)$=90 MHz (upshift); $(f_2-f_3)$=90.nn MHz (upshift), and $(f_1-f_2)$=0.nn MHz so that pulse repetition rate is 4×0.nn MHz, where nn are any suitable decimal number combination. For example, if 0.nn=0.05, then the carrier frequency of the main signal is 50 kHz and the pulse repetition rate is 200 kHz.

Alternatively, the electrical signal from Detector 608 which is at 90.04 MHz could be down-converted by multiplying it with a 90 MHz signal and low pass filtering the result. The 90 MHz signal is itself the product of $f_1$ and $f_3$ followed by low pass filtering, or from a separate 90 MHz RF source. The down-converted signal is then demodulated as previously.

Figure 8A:
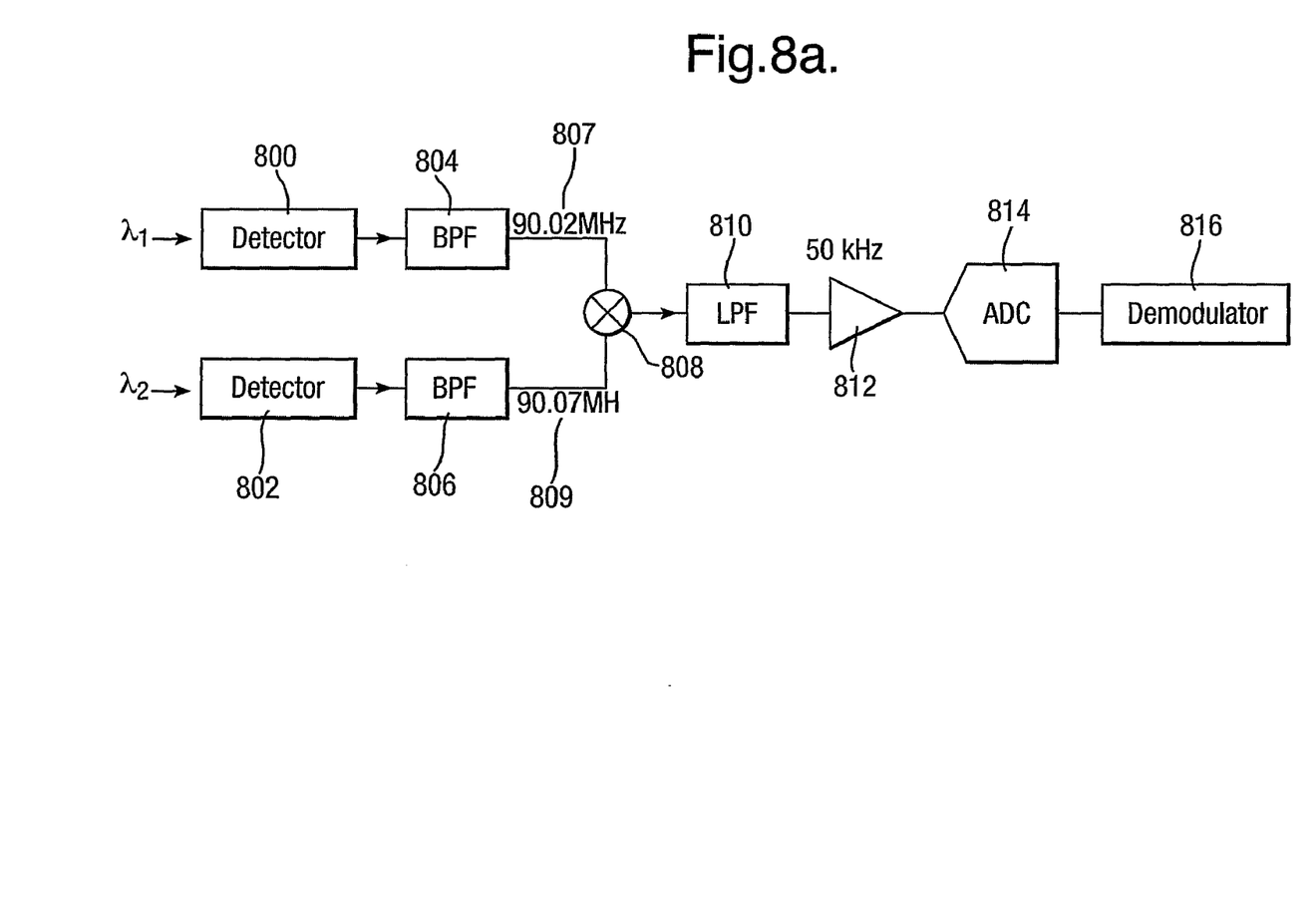
FIGS. 8a and 8b illustrate an alternative detector arrangement, and associated frequency diagram.
Figure 8B:
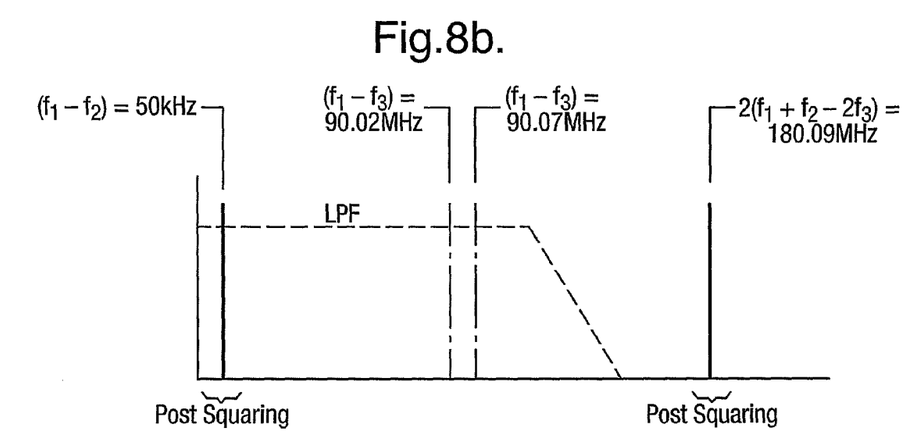

FIG. 8a shows a further embodiment for recovering the synthetic phase and involves the direct use of the optical outputs without mixing of the two wavelengths in the photodetector. Thus the mixing of the wavelengths is performed after photodetection, in the electrical domain as opposed to the arrangement of FIG. 6a where mixing occurs optically prior to photodetection. Light returned from the array and emerging from an optical demultiplexer travels towards detector 800 which detects wavelength $\lambda_1$ and detector 802 detects wavelength $\lambda_2$. If $f_1$=200.07 MHz ($\lambda_1$) and $f_2$=200.02 MHz ($\lambda_2$) and $f_3$=110.00 MHz ($\lambda_1$ and $\lambda_2$), then the carrier frequencies are $(f_1-f_3)$ of 90.07 MHz at 807 and $(f_2-f_3)$ of 90.02 MHz at 809. The electrical signal emerging from 800 and 802 are band-pass filtered in 804 and 806 respectively, where the centre frequency is nominally $(f_1-f_3)$ ~90 MHz, with a bandwidth of about ±10 MHz. After band-pass filtering the signals are mixed in a high frequency analogue four-quadrant multiplier 808 and subsequently low-pass filtered in 810. The cut-off of the low-pass filter is set so that the edge transitions of the pulses remain as received behind the photodetectors 800 and 802, but less than the sum frequency $2(f_1+f_2-2f_3)$ of 180.09 MHz so that there is significant rejection at the sum frequency. For practical purposes the cut-off of filter 810 of this example would be about 100 MHz. The output signal behind the low-pass filter is at the down-shifted frequency of 50 kHz whereupon the pulse repetition rate is 200 kHz. The analogue signals are then digitised in 812 and demodulated in 814. FIG. 8b gives a typical frequency domain plan showing the input, difference and sum frequency components prior to, and post-mixing in relation to the low-pass filter.

In this way, embodiments of the present invention allow a transducer, or array of transducers to be interrogated to provide a synthetic phase output having reduced sensitivity to overscale, and a more conventional phase output. The outputs can be selected adaptively, such that the synthetic phase is only relied upon during an overscale condition.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method of interrogating a phase based transducer, said transducer adapted to provide a phase output in response to a sensed parameter, said method comprising:
   inputting first and second input pulses to said transducer, said pulses having a time delay therebetween, and wherein at least one of said input pulses contains components of at least two different wavelengths;
   receiving an output from said transducer corresponding to a combination of said first and second input pulses; and
   performing interferometric detection on the output to produce a signal representative of the phase at a synthetic wavelength which is a combination of said two different wavelengths, said signal providing a measure of the sensed parameter.

2. A method according to claim 1, wherein both input pulses contain components of at least two different wavelengths.

3. A method according to claim 1, wherein one input pulse contains first and second different frequency components.

4. A method according to claim 3, wherein the other input pulse has a third single frequency.

5. A method according to claim 1, wherein the components of different wavelengths are combined using wavelength division multiplexing.

6. A method according to claim 1, wherein one pulse is formed of a first component having wavelength $\lambda_1$ and shifted by frequency $f_1$, and a second component having wavelength $\lambda_2$ and shifted by frequency $f_2$, and wherein the other pulse is formed of a first component having wavelength $\lambda_1$ and shifted by frequency $f_3$ and a second component having wavelength $\lambda_2$ and shifted by frequency $f_3$.

7. A method according to claim 6, wherein both $f_1-f_3$ and $f_2-f_3$ >> $f_1-f_2$.

8. A method according to claim 6, wherein the output is processed to produce a signal representative of the synthetic phase having a carrier frequency at substantially $f_1-f_2$.

9. A method according to claim 1 wherein the output is processed to produce a signal at a single input wavelength, representative of the phase at a single wavelength.

10. A method according to claim 1, wherein said transducer comprises at least one intrinsic fibre optic sensor.

11. A method according to claim 1, wherein said transducer is adapted to produce a single output pulse having components derived from both said input pulses.

12. A system for interrogating a phase based transducer, said system comprising
- a first signal source for generating a signal at a first wavelength,
- a second signal source for generating a signal at a second wavelength,
- a wavelength division multiplexer for combining signals at said first and second wavelengths, and
- an acousto-optic modulator for pulsing signals,
- wherein the system is arranged to output to said transducer at least two pulses, at least one of which contains both said first and second wavelengths and wherein said system further comprises a detector for receiving an output returned from said transducer in response to said at least two pulses and for using said output to produce a signal representative of the phase at a synthetic wavelength which is a combination of said first and second wavelengths.

13. A system according to claim 12, wherein the phase based sensor or transducer is one of a hydrophone, a geophone or an accelerometer.

14. A method of two-wavelength interrogation of a fibre optic phase based sensor, the method comprising:
- inputting at least two pulses to said sensor, said two pulses including at least two different wavelengths and three different frequencies, and
- using the resulting output to determine a measure of phase at a third synthetic wavelength which is a combination of said first and second wavelengths.

15. A method according to claim 14, wherein one pulse contains first and second different frequencies, and the other pulse contains a third frequency different from said first and second frequencies.

16. A method for interrogating a multiplexed fibre optic seismic array according to claim 14.

* * * * *